United States Patent [19]
Sashiki et al.

[11] Patent Number: 5,773,765
[45] Date of Patent: Jun. 30, 1998

[54] ATTACHMENT MECHANISM FOR A VIBRATORY ARTICLE TRANSPORTING APPARATUS

[75] Inventors: Takashi Sashiki; Yoshio Iwamoto, both of Shiga, Japan

[73] Assignee: Ishida Co., Ltd., Kyoto, Japan

[21] Appl. No.: 419,125

[22] Filed: Apr. 10, 1995

[30]     Foreign Application Priority Data

Apr. 15, 1994 [JP] Japan .................................. 6-102195

[51] Int. Cl.⁶ .......................... G01G 13/00; G01G 13/16
[52] U.S. Cl. .......................................... 177/25.12; 177/59
[58] Field of Search .................................. 24/20 TT, 484, 24/20 R, 21, 24, 26; 177/25.18, 59

[56]          References Cited

U.S. PATENT DOCUMENTS 4,468,842 9/1984 Perry et al. ................................ 24/279
4,553,616 11/1985 Haze .......................................... 177/1
4,573,717 3/1986 Peacock .................................. 285/365

*Primary Examiner*—Michael L. Gellner
*Assistant Examiner*—Michael J. Hayes
*Attorney, Agent, or Firm*—Keiichi Nishimura

[57]          ABSTRACT

A mechanism for attaching a feeder to a vibrator, such as incorporated in a combinational weighing machine for transporting articles to a weighing device, includes a pair of lower and upper engaging members attached respectively to the vibrator and to the feeder, the latter being placed on top of the former. A generally annular clamp is wrapped around and engages with the peripheral parts of the engaging members, and a diameter control device is provided to it for reducing its diameter and to thereby apply an inwardly oriented force on peripheral parts of the engaging members. At least one of the surfaces of the engaging members or the clamp across which the engaging members and the clamp are in contact is tapered such that this inward force will cause the engaging members to be pressed against each other and hence to attach the feeder firmly to the vibrator.

12 Claims, 7 Drawing Sheets

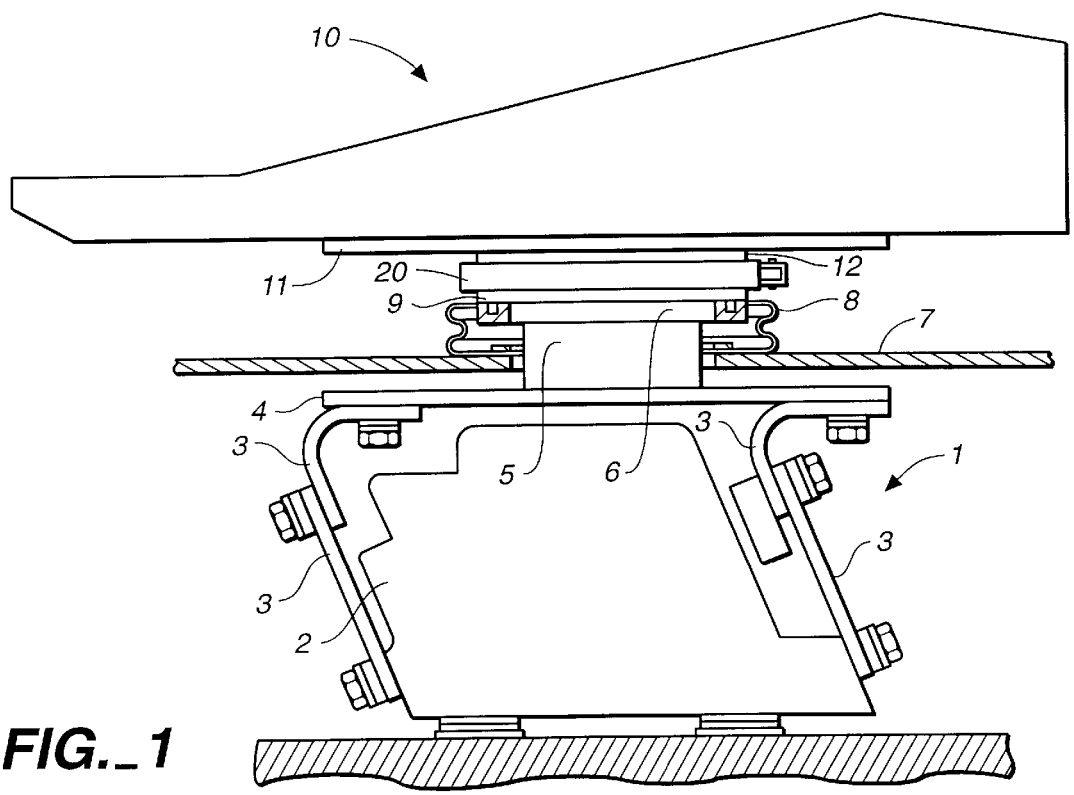
*FIG._1*
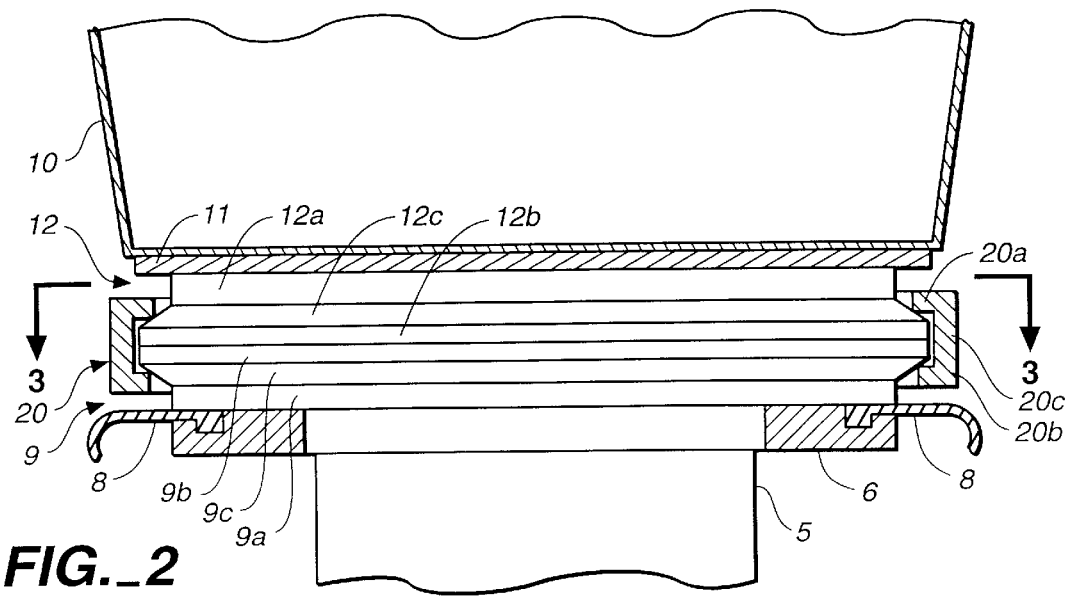
*FIG._2*

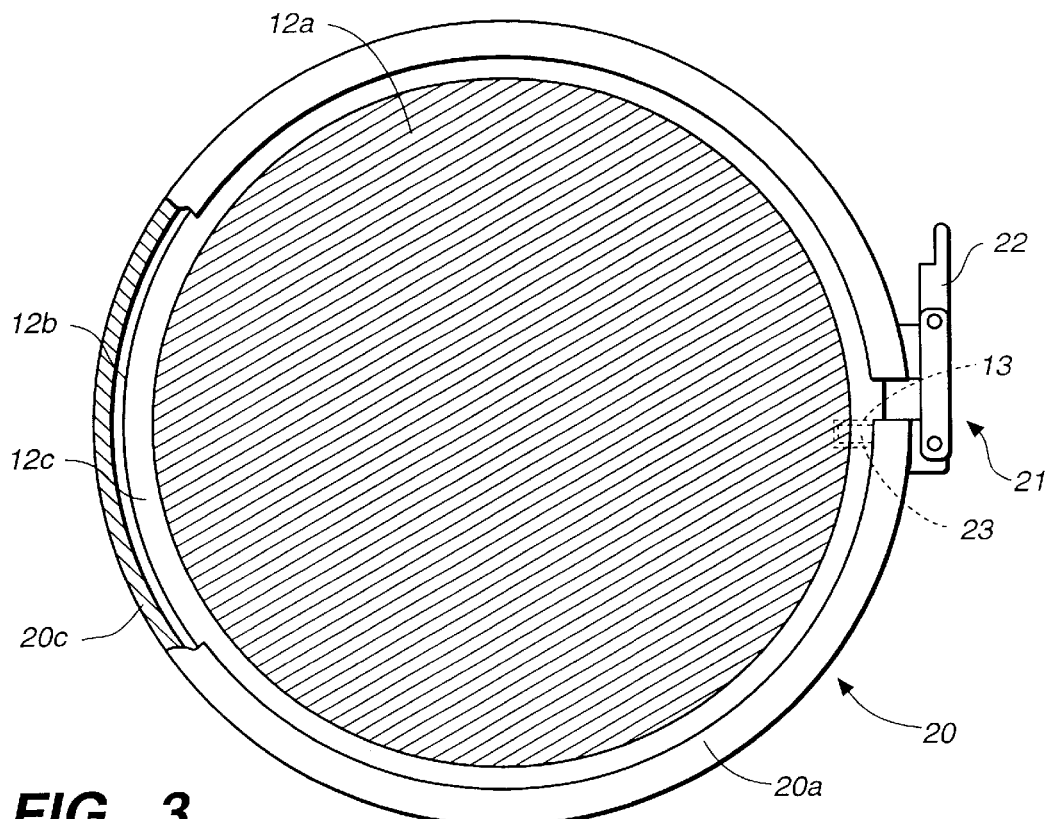
FIG._3
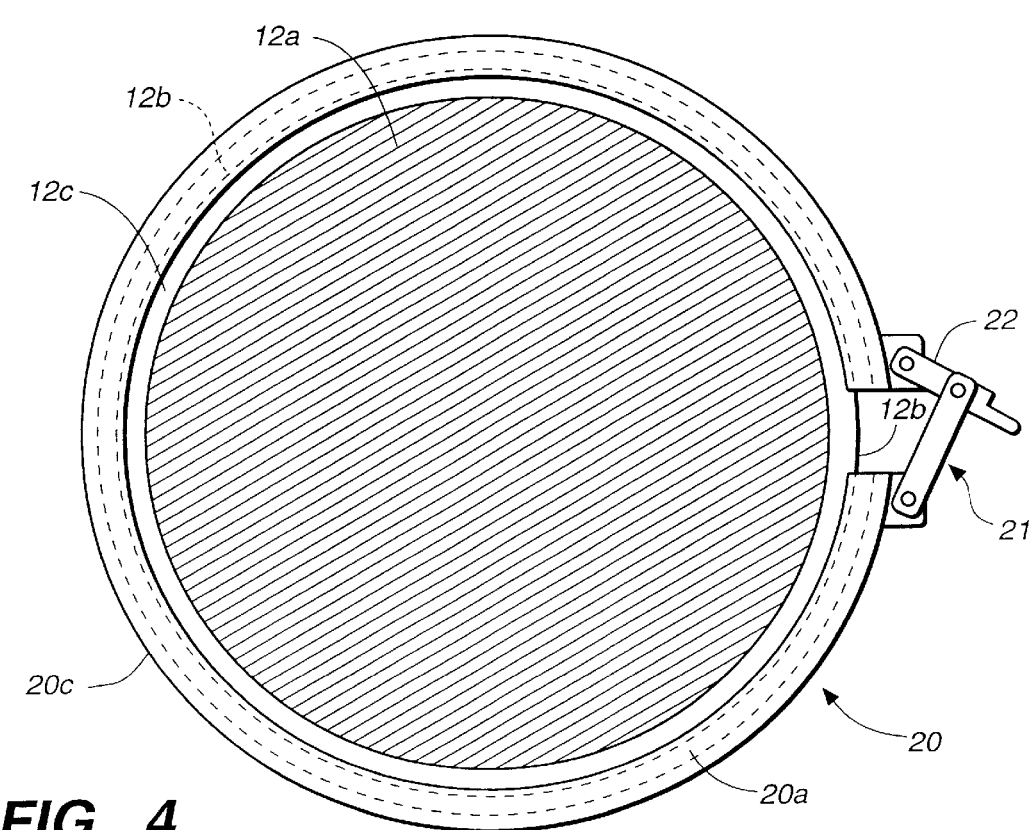
FIG._4

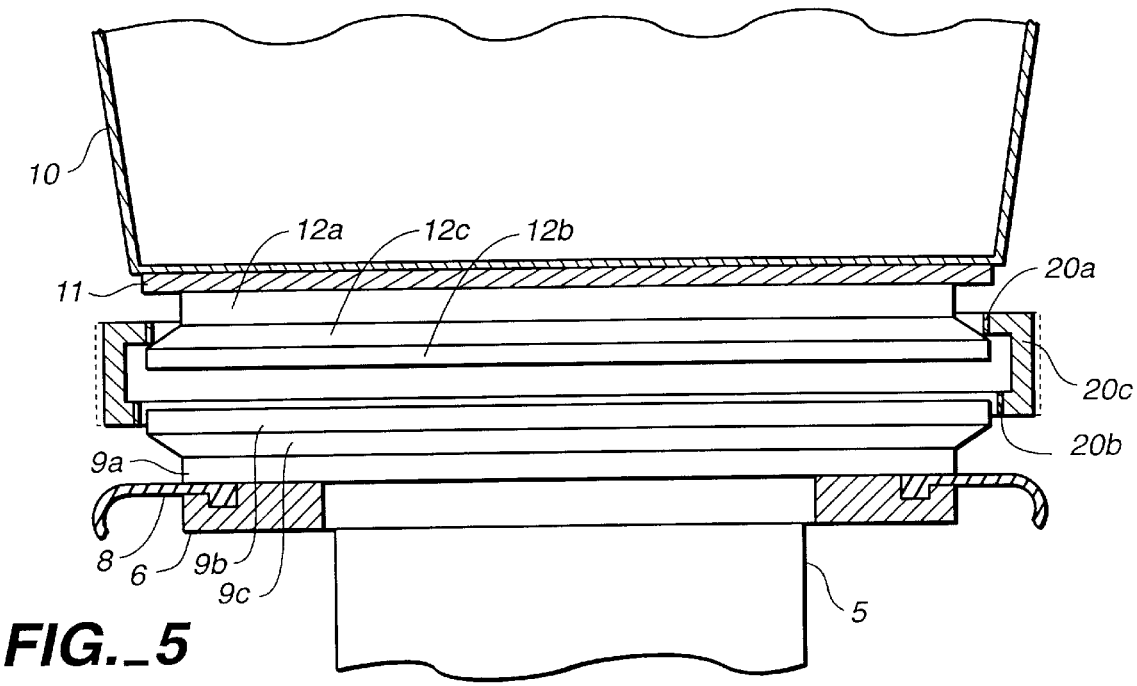
FIG._5
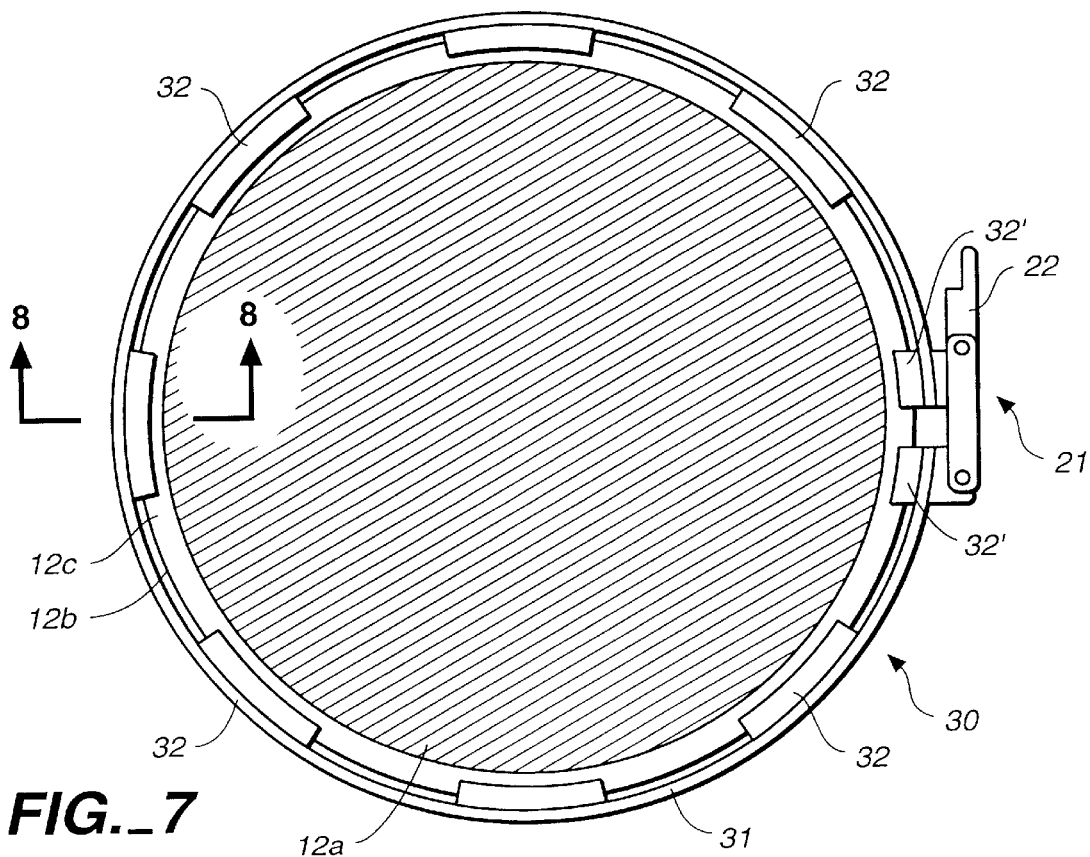
FIG._7

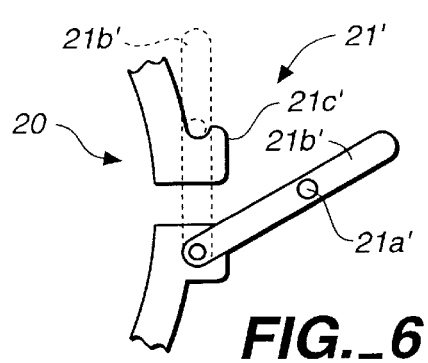
FIG._6
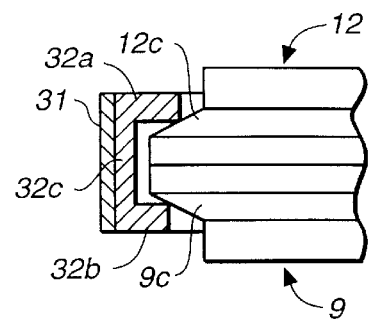
FIG._8
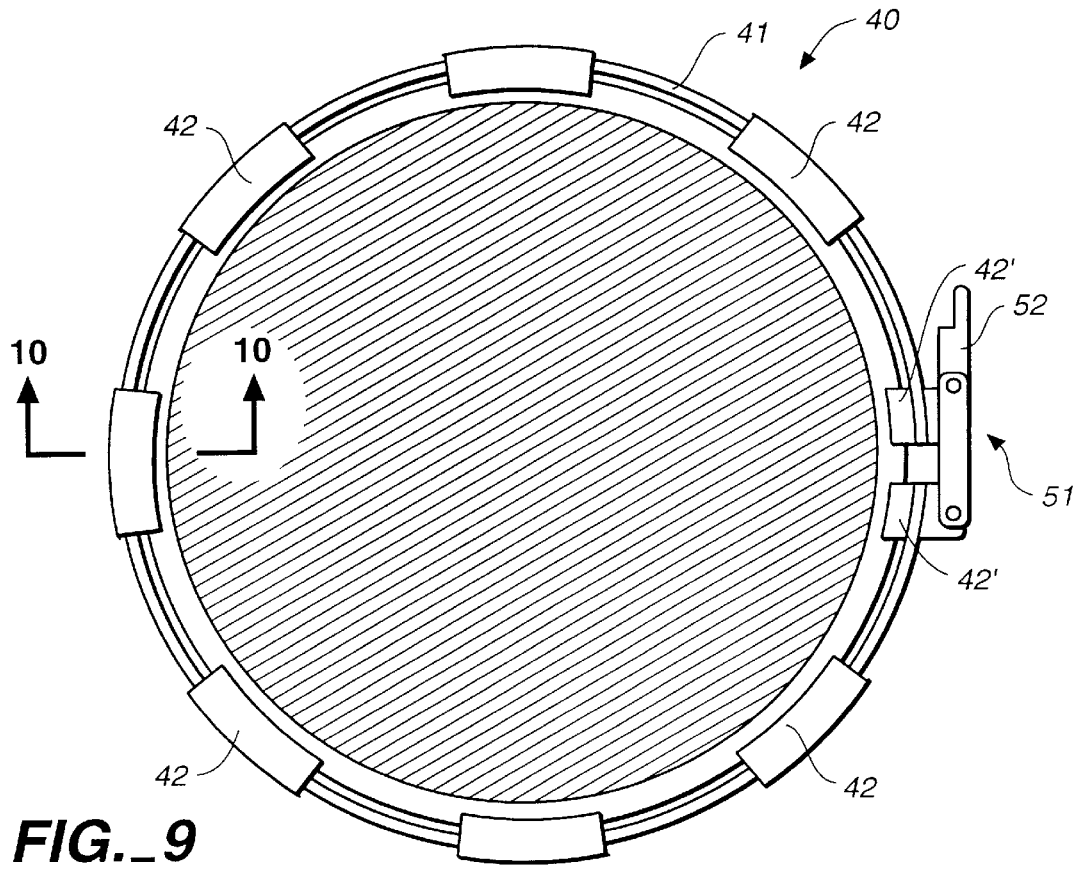
FIG._9
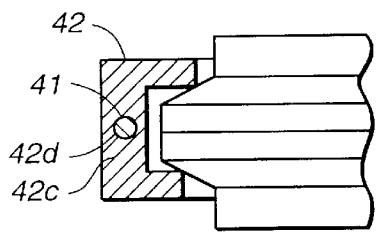
FIG._10

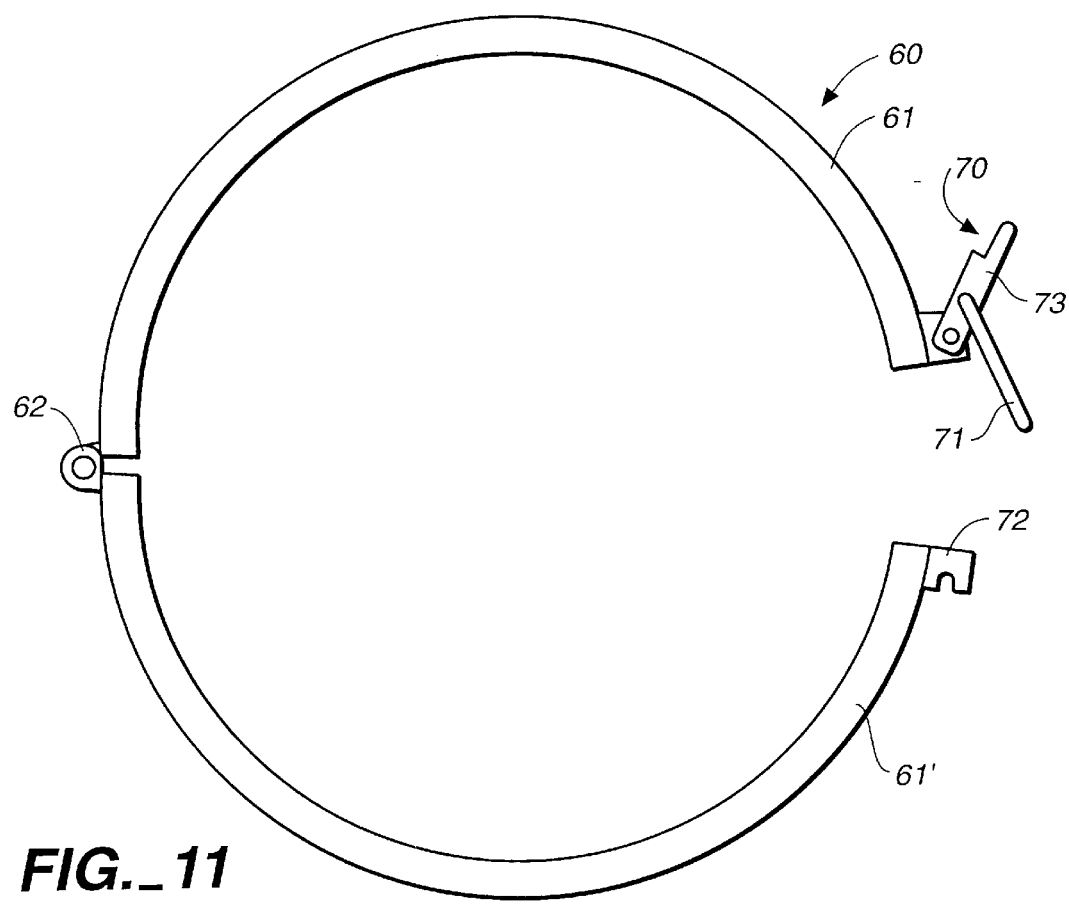
FIG._11
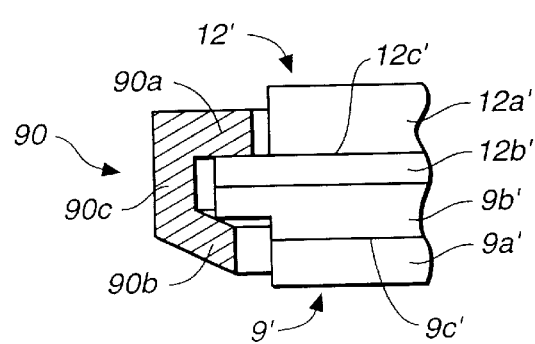
FIG._16
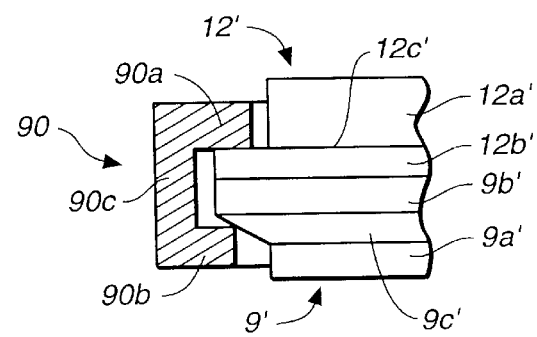
FIG._17

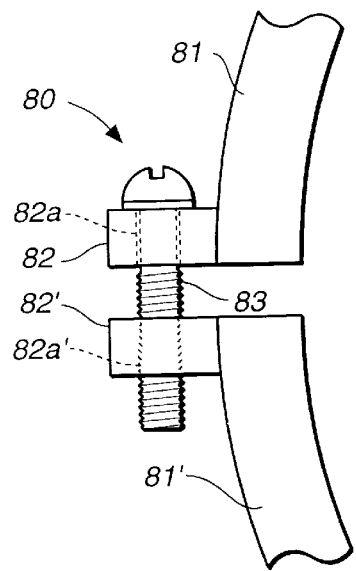
FIG._12
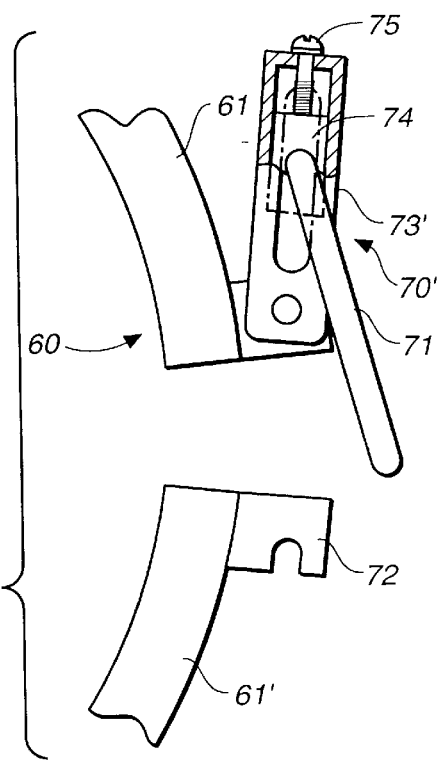
FIG._13
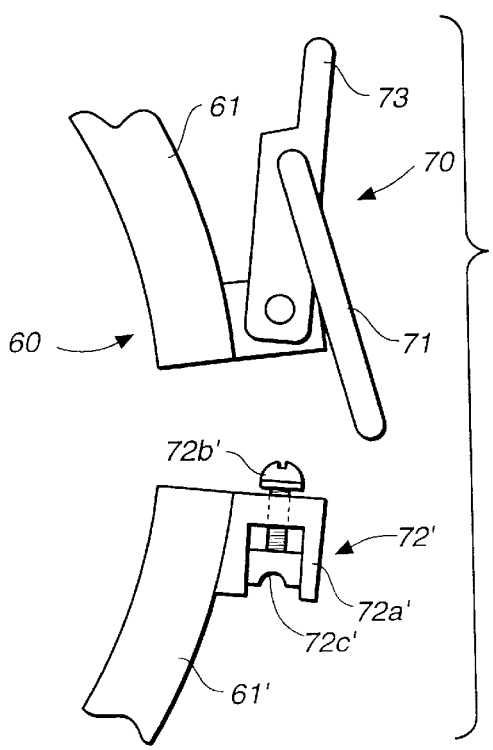
FIG._14
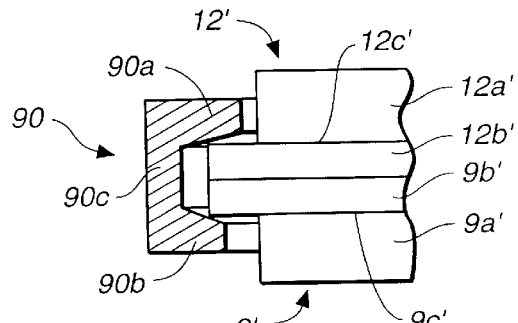
FIG._15

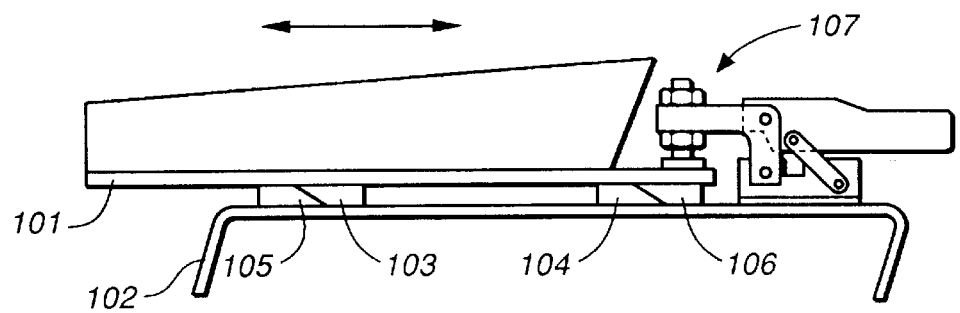
FIG._18
*(PRIOR ART)*
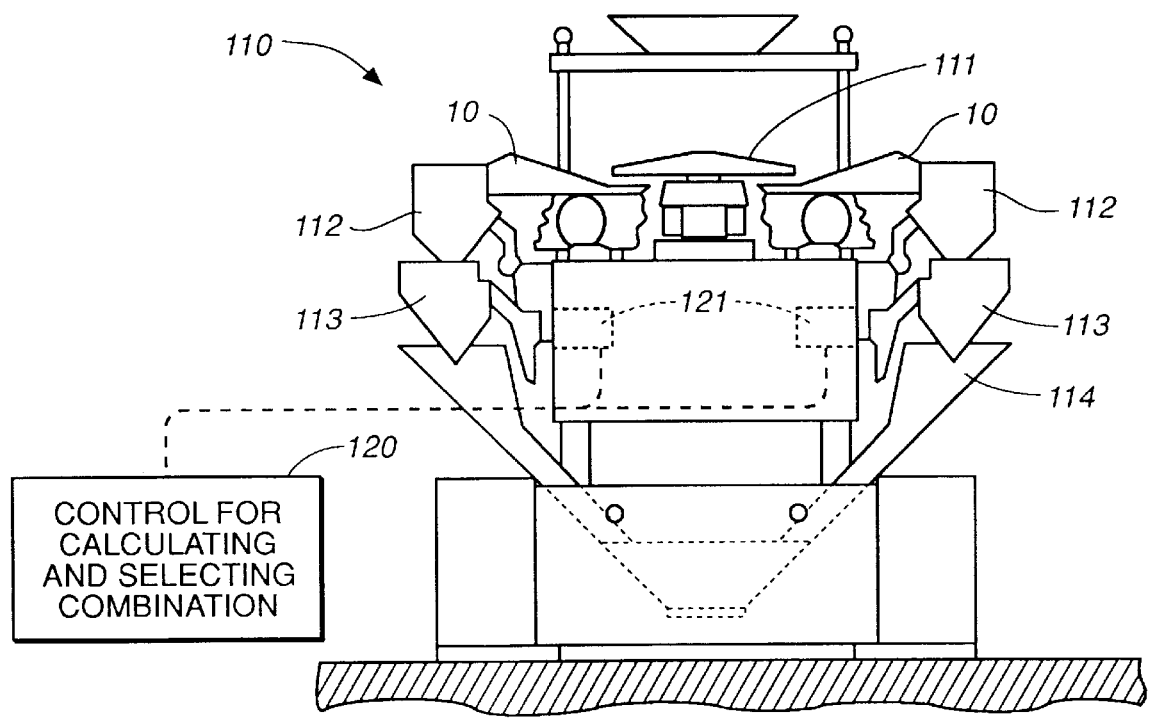
FIG._19

ATTACHMENT MECHANISM FOR A VIBRATORY ARTICLE TRANSPORTING APPARATUS

BACKGROUND OF THE INVENTION

This invention relates to a vibratory article transporting apparatus, and more particularly to a mechanism for attaching a feeder such as a trough for transporting articles thereon to an vibrator comprising, for example, an electromagnet for causing the feeder to vibrate in a specified direction to thereby cause the articles thereon to be transported in the direction of the vibration. This invention also relates to combinational weighing machines incorporating vibratory article transporting apparatus using such an attachment mechanism.

Since a vibratory article transporting apparatus of this kind is used to transport all kinds of articles including food items, its feeder (such as a trough) is frequently removed from the apparatus for cleaning. It is therefore strongly desired to provide an attachment mechanism whereby the feeder can be easily and dependably set on and removed from the vibrator. FIG. 18 shows an attachment mechanism disclosed in Japanese Utility Model Publication Jikkai 57-46828 for attaching the bottom plate 101 of a trough (serving as a feeder) to a base plate 102, comprising two positioning members 103 and 104 having sloped surfaces and attached to the top surface of the base plate 102 at a forward position and a backward position along the direction of vibration indicated by a double-headed arrow and two contact members 105 and 106 also having sloped surfaces and attached to the lower surface of the bottom plate 101. With the sloped surfaces of the positioning members 103 and 104 and those of the contact members 105 and 106 tightly pressed against each other, the bottom plate 101 of the trough is pressed to the base plate 102 by means of a toggle holder 107.

With a mechanism thus formed, the toggle holder 107 is used to press the bottom plate 101 of the trough downward from above against the base plate 102 for its attachment. When the trough is to be removed, the toggle holder 107 is operated in the reverse to remove the force pressing the bottom plate 101 and the base plate 102 together. Since articles on the trough are intended to move to the left with respect to FIG. 18 by the vibration of the trough, the compressive force by the toggle holder 107 must be sufficiently large such that the bottom plate 101 of the trough will not be displaced by the vibration. Moreover, since the positioning of the trough is effected by means of the positioning members 103 and 104, the contact members 105 and 106, and the toggle holder 107, only these components receive a locally concentrated force of vibrations. After many years of use, therefore, these components are likely to wear out, not only making it impossible to tightly mount the trough on the base plate but also increasing the possibility of a damage. If the trough cannot be attached tightly, furthermore, its vibration will cause noise, and the vibration of the vibrator cannot be effectively transmitted to the trough and the articles thereon cannot be transported efficiently.

SUMMARY OF THE INVENTION

It is therefore an object of this invention to provide a mechanism by which a feeder such as a trough can be easily and dependably attached to and removed from a vibrator to form an efficient vibratory article transporting apparatus such that its components are not easily worn out or damaged, noise will not be generated at the time of operation and the efficiency of transmission of vibration will not deteriorate.

A mechanism according to a first embodiment of the invention, with which the above and other objects can be accomplished, may be characterized as comprising mutually engageable upper and lower engaging members respectively attached to the lower surface of the trough and the upper surface of the vibrator and an annular clamp with a U-shaped cross-section such that peripheral parts of the two engaging members can fit between its upper and lower rims. At least one of the surfaces of the engaging members or the clamp through which they contact each other is tapered such that the radially inward horizontal force of the clamp, as a diameter controlling device is operated to reduce the diameter of the annular clamp, will cause the two engaging members to be compressed toward each other. Since this compressive force operates evenly along the peripheries of the engaging members, the applied force is evenly distributed and the feeder is securely attached to the vibrator and the vibration of the vibrator can be transmitted to the trough efficiently.

The annular clamp may be provided with a cross-sectionally U-shaped clamping member all around the peripheries of the engaging members such that the force for engaging the two engaging members operates efficiently whatever is the direction of the vibrator vibration. If a plurality of such clamping members are evenly distributed around the peripheries of the engaging members, it becomes possible to vary the number of the clamping members, depending on the length of the peripheries of the engaging members, and to provide different kinds of clamps suited for different circumstances. For example, the number of the clamping members can be reduced when the force of vibration is not very strong, thereby reducing the total weight of the attachment mechanism.

Alternatively, the annular clamp may comprise two cross-sectionally U-shaped semi-circular members hinged together at one end of each and adapted to be latched together at the other ends provided with a device for reducing the diameter of their semi-circles. A clump thus structured can be installed and removal very easily.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a side view of a vibratory article transporting apparatus incorporating a mechanism according to a first embodiment of this invention for attaching a trough;

FIG. 2 is a sectional side view of a portion of the vibratory article transporting apparatus shown in FIG. 1;

FIG. 3 is a sectional plan view taken along line 3—3 of FIG. 2 when the annular clamp is tightened;

FIG. 4 is another sectional plan view taken along line 3—3 of FIG. 2 when the annular clamp is loosened;

FIG. 5 is another sectional side view of the vibratory article transporting apparatus of FIG. 1 when the annular clamp is in the loosened condition shown in FIG. 4;

FIG. 6 is a plan view of another diameter control device which may be substituted for the one shown in FIGS. 3 and 4;

FIG. 7 is a sectional plan view of a vibratory article transporting apparatus incorporating an attachment mechanism according to a second embodiment of this invention for attaching a trough;

FIG. 8 is a sectional view of a portion of the attachment mechanism of FIG. 7 taken along line 8—8 therein;

FIG. 9 is a sectional plan view of a vibratory article transporting apparatus incorporating an attachment mechanism according to a third embodiment of this invention for attaching a trough;

FIG. 10 is a sectional view of a portion of the attachment mechanism of FIG. 9 taken along line 10—10 therein;

FIG. 11 is a plan view of an annular clamp according to a fourth embodiment of this invention;

FIG. 12 is a plan view of a portion of another annular clamp according to the fourth embodiment of this invention;

FIG. 13 is a plan view of another latching means which may be used with an annular clamp according to the fourth embodiment of this invention;

FIG. 14 is a plan view of still another latching means which may be used with an annular clamp according to the fourth embodiment of this invention;

FIG. 15 is a sectional side view of a portion of another vibratory article transporting apparatus embodying this invention;

FIG. 16 is a sectional side view of a portion of still another vibratory article transporting apparatus embodying this invention;

FIG. 17 is a sectional side view of a portion of still another vibratory article transporting apparatus embodying this invention;

FIG. 18 is a side view of a portion of a prior art vibratory article transporting apparatus; and FIG. 19 is a schematic drawing showing the structure of an example of a combinational weighing machine which may incorporate attachment mechanisms of this invention.

Throughout herein, components which are nearly identical or at least equivalent to each other are sometimes indicated by the same numeral for convenience.

DETAILED DESCRIPTION OF THE INVENTION

FIG. 1 is a side view of a vibratory article transporting apparatus incorporating a mechanism according to a first embodiment of this invention for attaching a trough 10 to a vibrator housing 1 for a vibrator 2 which may be of a type using an electromagnet as a vibration source. A base plate 4, to which the trough 10 is adapted to be attached, is maintained in a horizontal position by means of plate springs 3 which also serve to transmit the vibration of the vibrator 2 to the base plate 4. A cylindrical support member 5 for the attachment of the trough 10 is attached to the upper surface of the base plate 4, and a support disk 6 is attached on top of this support member 5. A sealing member 8 made of an elastic material is provided between the support disk 6 and a table plate 7 which is positioned so as to horizontally cover the upper portion of the vibrator housing 1 and to thereby prevent unwanted foreign objects from entering the vibrator housing 1 when, for example, the table plate 7 is washed.

A lower engaging member 9 is affixed to the upper surface of the support disk 6, and an upper engaging member 12 is similarly affixed to the bottom surface of the trough 10 through a bottom plate 11. An annular clamp 20 for attachment of the trough 10 is disposed around the outer peripheral surfaces of these engaging members 9 and 12 for pressing the upper engaging member 12 against the lower engaging member 9 to thereby attach them together.

Explained more in detail with reference to FIG. 2, the lower and upper engaging members 9 and 12 are each composed of an upper part and a lower part both having a circular cross-sectional shape. The lower part of the lower engaging member 9 is herein referred to as a supporting part 9a and is in contact with the support disk 6. The upper part of the lower engaging member 9 is herein referred to as a disk part 9b, having a lower surface 9c protruding outwardly from where it contacts the upper surface of the supporting part 9a and tapered where it so protrudes outward, the upper surface of the disk part 9b being flat. Similarly, the upper part of the upper engaging member 12 is herein referred to as a supporting part 12a and is in contact with the bottom plate 11 of the trough 10. The lower part of the upper engaging member 12 is herein referred to as a disk part 12b, having an upper surface 12c protruding outwardly from where it contacts the lower surface of the supporting part 12a and tapered where it so protrudes outward. The lower surface of the disk part 12b is flat, like the upper surface of the disk part 9b of the lower engaging member 9.

The two supporting parts 9a and 12a have a same diameter, and so do the two disk parts 9b and 12b, the diameter of the supporting parts 9a and 12a being smaller than that of the disk parts 9b and 12b. The lower and upper engaging members 9 and 12 are so formed that, when they are coupled together with the flat upper surface of the disk part 9b of the lower engaging member 9 tightly attached to the flat lower surface of the disk part 12b of the upper engaging member 12 such that their centers coincide, they together form a vertically symmetric structure.

After the lower and upper engaging members 9 and 12 are thus arranged with respect to each other, they are pressed to each other with the annular clamp 20 clamping together the peripheral portions of the disk parts 9b and 12b that protrude outward.

The annular clamp 20 has an upper rim 20a and a lower rim 20b horizontally protruding radially inward from a vertical side rim 20c, the lower rim 20b being somewhat narrower radially than the upper rim 20a. In other words, these rims 20a, 20b and 20c together have an approximately U-shaped cross-sectional configuration, having a groove when seen from the center of the annular clamp 20. Seen from above, this annular clamp 20 is almost completely circular, as shown in FIG. 3, except it is discontinuous at one part such that it may be described as being C-shaped. A diameter controlling device 21 with a lever 22 for reducing the diameter of the annular clamp 20 is provided, reaching both ends of the nearly completely circular clamp 20 where it is discontinuous, or where there is a gap. The annular clamp 20 and the diameter controlling device 21 are so designed that, as the lever 22 is operated to narrow the gap and thereby reduce the diameter of the clamp 20, the outer peripheral parts of the disk parts 9b and 12b enter the groove formed between the upper and lower rims 20a and 20b without touching the side rim 20c, and the upper and lower rims 20a and 20b of the clamp 20 touch the tapered peripheral parts of the surfaces 12c and 9c, respectively, as shown in FIGS. 2 and 3.

Explained more in detail, the upper, lower and side rims 20a, 20b and 20c move horizontally inward as the gap in the annular clamp 20 is narrowed and its diameter is thereby reduced. As a result, the upper and lower rims 20a and 20b come into contact with and apply horizontal forces on the tapered surfaces 12c and 9c. The horizontal force acting on the tapered surface 9c tends to push the lower engaging member 9 both upward and radially inward towards the center. The horizontal force acting on the tapered surface 12c tends to push the upper engaging member 12 both downward and radially inward towards the center. Thus, the upper and lower engaging members 12 and 9 are strongly pressed against each other, that is, the trough 10 is securely attached to the vibrator housing 1. Since the annular clamp 20 is almost completely circular and hence its upper and lower rims 20a and 20b surround the engaging members 9 and 12 nearly entirely, the compressive force by which the two engaging members 9 and 12 are pressed against each other is applied evenly all around their outer peripheries and is equally effective independent of the direction of vibration of the vibrator 2. In other words, effects of vibrations are not locally concentrated to any particular component, and dependable and secure attachment of the trough 10 can be accomplished.

When the trough 10 is to be removed, the lever 22 of the diameter controlling device 21 is operated in the reverse direction as shown in FIG. 4 to release the gap-narrowing force and to increase the diameter of the annular clamp 20 to thereby cause its upper and lower rims 20a and 20b to separate from the tapered surfaces 12c and 9c, respectively, and to remove the compressive force between the upper and lower engaging members 12 and 9. In other words, as the force which served to narrow the gap in the clamp 20 and to thereby reduce its diameter is removed, the clamp 20 can return to its natural loosened condition.

Dimensions of the individual parts of the clamp 20 are determined with respect to those of the upper and lower engaging members 12 and 9 such that, when the clamp 20 has returned to its loosened condition, the lower rim 20b, which is narrower and hence protrudes less from the side rim 20c in the radial direction, separates completely from the disk part 9b of the lower engaging member 9 but the upper rim 20a, which is wider, remains hooked onto the tapered surface 12c of the upper engaging member 12, as shown in FIG. 5. Thus, even after the force on the annular clamp 20 is removed, the clamp 20 does not fall off the engaging members 9 and 12 to thereby sustain damage. Since the upper engaging member 12 and the trough 10 can be removed together with the clamp 20, the user can avoid the components of the mechanism becoming separated from each other, scattered around and misplaced or lost.

If it is desired to completely remove the annular clamp 20 from the upper engaging member 12, this can be accomplished by turning the lever 22 of the diameter controlling device 21 in the opposite direction so as to keep increasing the diameter of the clamp 20 until the upper rim 20a completely separates from the disk part 12b of the upper engaging member 12 as shown by dotted lines in FIG. 5.

As a modification, an inward protrusion may be provided somewhere on the annular clamp 20 as outlined by a dotted line in FIG. 3 at 23, and a corresponding indentation 13 in the engaging members 9 and 12 such that the protrusion 23 is received in the indentation 13. They can thus serve as positioning means for the clamp 20 with respect to the engaging members 9 and 12, helping the user to easily find the position of the diameter controlling device 21 when attaching or removing the trough 10. The work efficiency can thus be improved.

Although only one kind of diameter control mechanism 21 has been disclosed above, this is not intended to limit the scope of the invention. FIG. 6 shows another kind of diameter controlling device 21' which may be used in combination with a mechanism according to this invention. This diameter control mechanism 21' is characterized as having a lever 21b' which has a stopper pin 21a' thereon, one end of which is rotatably attached to one of the end parts of the annular ring 20. A protrusion 21c' is formed on the other end part of the ring 20 such that the stopper pin 21a' can be hooked onto the protrusion 21c'. When the diameter of the clamp 20 is reduced for tightening the clamp 20 around the engaging members 9 and 12, the lever is turned as shown by dotted line in FIG. 6 to hook the stopper pin 21a' to the protrusion 21c'.

FIG. 7 shows another trough attaching mechanism according to a second embodiment of this invention characterized as having an annular clamp 30 which comprises a C-shaped belt-like elongated member 31 which is nearly completely circular except for a gap to provide a discontinuity, seven clamping members 32 attached to the inner surface of the belt-like member 31 at even intervals therebetween, and two small clamping members 32' each attached to an end part of the beltlike member 31, or at opposite sides of the gap in the C-shaped belt-like member 31. A diameter controlling device 21 for contracting the diameter of the C-shaped belt-like member 31 is attached to both sides of its gap.

Each of the clamping members 32 and 32' shown in FIG. 7 is cross-sectionally shaped similarly to the clamp 20 described above with reference particularly to FIGS. 2 and 5 in that they have a wider horizontal upper rim 32a, a narrower horizontal lower rim 32b, and a vertical side rim 32c, from the top and bottom edges of which the upper and bottom rims 32a and 32b protrude. Thus, they are cross-sectionally U-shaped, having a horizontal groove facing the center of the nearly completely circular C-shaped belt-like member 31, as shown in FIG. 8. The outer surface of the side rim 32c is attached to the inner surface of the belt-like member 31. As shown in FIG. 7, each of these clamping members 32 and 32' contacts only a portion of the disk parts 9b and 12b of the engaging members 9 and 12.

As the lever 22 of the diameter controlling device 21 is pushed to contract the diameter of the C-shaped belt-like member 31, the engaging members 9 and 12 are compressed towards each other by the annular clamp 30, the upper and lower rims 32a and 32b of the clamping members 32 and 32' contacting the tapered surfaces 12c and 9c as explained above with reference to the attachment mechanism according to the first embodiment of this invention, and the trough 10 becomes securely attached to the vibrator housing 1. Because the seven clamping members 32 and the two smaller clamping members 32' are set substantially at equal intervals, none of them will receive an unfair share of vibrations from the vibrator 2 and, since the clamping force is evenly distributed around the peripheries of the engaging members 9 and 12, the trough 10 is not only attached strongly but also well balanced when attached.

Because the annular clamp 30 according to this embodiment of the invention is formed with a plurality of clamping members 32 and 32' attached to a belt-like member 31, many different clamps can be produced, depending on the length of the circumference of the engaging members 9 and 12, by varying the lengths of the belt-like member 31 and the clamping members 32 and 32'.

The number of clamping members 32 can also be varied. If the force of vibration is relatively weak and the trough 10 can be securely attached with a weaker clamping force, for example, the number of the clamping members 32 may be reduced to six in order to reduce the total weight of the annular clamp 30. For balancing the clamping force, it is desirable to set the clamping members 32 at even intervals, independent of the number thereof.

FIG. 9 shows still another trough attaching mechanism according to a third embodiment of this invention characterized as having an annular clamp 40 formed with a wire 41, seven clamping members 42 distributed at equal intervals on the wire 41 and two smaller clamping members 42' at both ends of the wire 41. A diameter controlling device 51 with a lever 52 is attached to the ends of the wire 41, for changing the diameter of the circular form in which the wire 41 is arranged. The clamping members 42 are structured similarly to the clamping members 32 described above with reference to FIGS. 7 and 8 except their vertical side rims 42c have a horizontal throughhole 42d. The wire 41 passes through the throughholes 42d to attach the clamping members 32 thereto.

The clamp 40 according to this embodiment is advantageous in that it can be set easily by passing the wire 41 through the clamping members 42. The positioning of the claiming members 42 can be equally easily effected simply by sliding these clamping members 42 along the wire 41 to the left or to the right.

FIG. 11 shows still another trough attaching mechanism according to a fourth embodiment of this invention characterized wherein its annular clamp 60 comprises a pair of semi-circular clamping members 61 and 61' each having a generally U-shaped cross-sectional shape as described above with reference to the other embodiments of this invention. The two clamping members 61 and 61' are connected by a hinge 62 at one end of each such that they can be opened or closed. The other ends of the clamping members 61 and 61' are provided with a latching means 70 for connecting them together by means of a hooking bar 71 connected to a lever 73 and a notched piece 72 for receiving the bar 71 for locking.

When the clamp 60 is used for clamping, the open ends of the two clamping members 61 and 61' are brought closer to each other, and the lever 73 is pushed after the bar 71 is hooked onto the notched piece 72. The clamp 60 then assumes a completely circular shape and compresses the upper and lower engaging members 12 and 9 together.

When the clamp 60 is to be removed from the engaging members 9 and 12, the lever 73 is pulled in the opposite direction so as to separate the bar 71 from the notched piece 72. This causes the free ends of the two clamping members 61 and 61' to separate, and the hinge 62 allows the separation between the free ends to increase further such that the clamp 60 as a whole can be removed horizontally from the engaging members 9 and 12. In other words, this clamp 60 can be set or removed while the upper engaging member 12 remains on top of the lower engaging member 9. This means that the clamp 60 can be handled easily and hence that the trough 10 can be attached and removed efficiently.

FIG. 12 shows another annular clamp 80 having a device different from the hinge 62 of an ordinary kind shown in FIG. 11 for connecting ends of two semicircular clamping members 81 and 81'. Outward protrusions 82 and 82' are provided at ends of these clamping members 81 and 81'. One of the protrusions (82') has an internally threaded throughhole 82a' formed therethrough, and the other protrusion (82) has formed therethrough a throughhole 82a with a smooth inner surface having a larger inner diameter, a screw 83 being passed through the second throughhole 82a and engaging the threads inside the first throughhole 82', thereby connecting the two protrusions 82 and 82' and controlling the inner diameter of the clamp 80 when it is tightened.

FIG. 13 shows another latching means 70' which may be used with the annular clamp 60 according to the fourth embodiment of the invention, different from the latching means 70 shown in FIG. 11 in that it has a hollow lever 73' containing therein a block 74 which is slidable inside the internal space of the hollow lever 73' and to which a hooking bar 71 is attached. A screw 75 is attached to the block 74 from outside through an end wall such that the block 74 can slide longitudinally inside the internal space of the hollow lever 73', thereby controllably changing the distance between the bar 71 and the notched piece 72 and hence also the tightening force provided by the clamp 60.

FIG. 14 shows still another latching means 70 which may be used on the annular clamp 60 according to the fourth embodiment of the invention, different from the one shown in FIG. 11 in that the notched piece 72 shown in FIG. 11 is replaced by an adjustable notch device 72' comprising a casing structure 72a', a screw 72b' and a notched stopper member 72c'. The casing structure 72a' is cross-sectionally U-shaped with a base plate and two side walls. The base plate has a threaded throughhole, and the screw 72b' is adapted to move through the throughhole when turned around. The stopper member 72c' is sandwiched between the two side walls of the casing structure 72a' and is rotatably attached to the end of the screw 72b' such that, as the screw 72b' is turned around, the stopper member 72c' slides along between and parallel to the two side walls of the casing structure 72a', keeping the notch thereon oriented in the same direction. Thus, the distance between the notch on the stopper member 72c' and the hooking bar 71 can be varied and hence the tightening force by the clamp 60 can be thereby adjusted.

Although the invention has been described above by way of only a limited number of examples, these examples are not intended to limit the scope of the invention. Many modifications and variations on these examples are possible within the scope of the invention. For example, the lower surface 9c of the disk part 9b of the lower engaging member 9 and the upper surface 12c of the disk part 12b of the upper engaging member 12 are tapered and both the lower surface of the upper rim (such as shown at 20a) and the upper surface of the lower rim (such as shown at 20b) are horizontal in all of the examples described above, but FIG. 15 shows a variation also within the scope of this invention wherein a lower engaging member 9' and an upper engaging member 12' are respectively composed of a supporting part 9a' or 12a' and a disk part 9b' or 12a', and the lower surface 9c' of the disk part 9b' and the upper surface 12c' of the disk part 12b' are both horizontal. An annular clamp 90 for compressing peripheral parts of the disk parts 9b' and 12b' together may be cross-sectionally U-shaped, like the clamp 20 and clamp members 32 described above, having an upper rim 90a, a lower rim 90b and a vertical side rim 90c but the lower surface of the upper rim 90a and the upper surface of the lower rim 90b are tapered such that the distance therebetween is smaller near the side rim 90c. With the disk surfaces 9c' and 12c' and the clamp 90 thus designed, too, the horizontally inward force from the clamp 90 onto the disk parts 9b' and 12b', as the diameter of the annular clamp 90 is diminished, will have the effect of pressing the two engaging members 9 and 12 towards each other.

FIG. 16 shows a variation of the embodiment shown in FIG. 15, different therefrom in that only the upper surface of the lower rim 90b is tapered, the lower surface of the upper rim 90a being horizontal. FIG. 17 shows another variation characterized wherein both the lower surface of the upper rim 90a and the upper surface of the lower rim 90b are horizontal but the lower surface 9c' of the disk part 9b' of the lower engaging member 9 is tapered, the surface 12c' of the upper engaging member 12 being horizontal. In other words, if at least one of the surfaces selected from the group consisting of the lower surface 9c' of the disk part 9b' of the lower engaging member 9, the upper surface 12c' of the disk part 12b' of the upper engaging member 12, the lower surface of the upper rim and the upper surface of the lower rim is tapered, the horizontally inward force on the tapered surface or surfaces, as the diameter of the annular clamp is diminished, is converted into a vertical force which contributes to compression between the upper and lower engaging members 12 and 9.

Although only circular engaging members and annular clamps of a generally circular shape have been disclosed above, neither is this intended to limit the scope of the invention. They may be elliptical or polygonal (such as hexagonal or octagonal) because the clamping force acts not just in one direction but in many different directions.

Attachment mechanisms according to this invention have many advantages. Firstly, effects of local vibrations can be reduced and locally concentrated wears and tears of components can be avoided independent of the direction of the vibration because the force of engaging the trough is evenly distributed around the peripheries of the parts required for the attachment. Secondly, the vibration of the vibrator can be effectively transmitted to the trough without causing noise because the engagement between the two engaging parts is effected over tapered surfaces and a horizontally applied force is converted into a vertically compressing force between the engaging parts. Thirdly, if a plurality of clamping members are connected to form the clamping means as shown in FIG. 9, the number of clamping members can be adjusted according to the strength of the vibrator. The number of clamping members can be reduced, for example, if the vibration is not strong, and this can reduce the overall weight of the clamp. Fourthly, if the clamping means is formed with two semi-circular pieces hinged together as shown in FIG. 11, its setting and removal become simplified and the feeder can be easily engaged with or disengaged from the vibrator.

Vibratory article transporting apparatus as described above may be, for example, a part of a larger system such as a combinational weighing machine. This invention relates also to combinational weighing machines incorporating attachment mechanisms of types described above.

Principles of combinational weighing have been known, and many kinds of combinational weighing machine have been both described in publications such as U.S. Pat. Nos. 4,553,616, 4,560,015, 4,570,727, 4,642,788, 4,708,215, 4,771,836 and 4,844,190 which are herein incorporated by reference as describing some relevant components which are frequently used in the structure of a combinational weighing machine and commercially available. FIG. 19 is a schematic drawing which shows the structure of a combinational weighing machine 110 which may incorporate attachment mechanisms of a type described above embodying the invention but it is to be remembered that attachment mechanisms of this invention can be incorporated in many other kinds of combinational weighing machines and other systems and that FIG. 19 is presented only as an example.

The exemplary combinational weighing machine 110, as shown in FIG. 19, is of a kind having a conically shaped dispersion feeder 111 at the center for receiving articles to be weighed which are dropped from above and distributing these articles radially outward by its vibratory motion. A plurality of weighing devices are disposed around the dispersion feeder 111 at the center. Each weighing device has a radially elongated trough 10 for receiving a portion of the articles from the dispersion feeder 111 and transporting them radially outward into a pool hopper 112 for temporarily keeping the received articles therein. In response to a signal received from a control unit schematically, the pool hopper 112 opens its gates to drop the articles held therein (or a batch) down into a weigh hopper 113 disposed therebelow. The weigh hopper 113 is connected to a weight-measuring means such as a load cell 121 adapted to output a signal indicative of the measured weight of the article batch in the weigh hopper 113. The weight signals received from the weight-measuring means from different weighing devices are combined by the control unit, which also serves to select one of the combinations according to a prescribed criterion such as the particular combination having a total weight of articles which is the closest to and above a preliminarily inputted target weight value, causing the gates of the weigh hoppers 113 belonging to the selected combination to open and to thereby discharge the articles therein. A chute 114 is disposed below the weigh hoppers 113 of all the weighing devices for collecting the articles discharged from the selected ones of the weigh hoppers 113, say, to a packaging machine disposed therebelow. The control unit further serves to open the gates of the pool hoppers 112 corresponding to the weigh hoppers 113 which have just discharged their contents, as well as the vibrations of the dispersion feeder 111 and the individual troughs 10.

In summary, this invention includes not only many modifications and variations on the kinds of attachment mechanisms disclosed above that may be apparent to a person skilled in the art but also weighing machines of many types such as combinational weighing machines that incorporate them.

What is claimed is:

1. A mechanism for attaching a feeder to a vibrator, said mechanism comprising:

a lower engaging member attached to said vibrator;

an upper engaging member attached to said feeder and being placed on and engageable with said lower engaging member, said lower and upper engaging members each having a peripheral part;

an annular clamp which has an inner surface and is wrapped around and engageable with said peripheral parts of said lower and upper engaging members together, at least one selected from the peripheral part of said lower engaging part and the peripheral part of said upper engaging member being tapered with respect to said inner surface of said annular clamp; and a diameter controlling device attached to said clamp for reducing a diameter of said clamp and thereby causing said lower and upper engaging members to be pressed against each other.

2. The mechanism of claim 1 wherein said clamp comprises a clamping member having a generally U-shaped cross-section with a groove capable of accepting therein and engaging with said peripheral parts of said lower and upper engaging members.

3. The mechanism of claim 2 wherein said clamping member engages with said peripheral parts substantially entirely.

4. The mechanism of claim 1 wherein said clamp comprises a plurality of clamping members each having a generally U-shaped cross-section with a groove capable of accepting a portion of said peripheral parts of said lower and upper engaging members therein and engaging with said portion of said peripheral parts, said plurality of clamping members being evenly distributed on said peripheral parts.

5. The mechanism of claim 1 wherein said clamp comprises a lower rim which engages with the peripheral part of said lower engaging member and an upper rim which engages with the peripheral part of said upper engaging member; wherein at least one selected from the group consisting of the peripheral part of said lower engaging member, the peripheral part of said upper engaging member, said lower rim and said upper rim has a tapered surface; and wherein a force of said clamp communicated through said tapered surface, as the diameter of said clamp is reduced, causes said lower and upper engaging members to be pressed towards each other.

6. The mechanism of claim 1 wherein said clamp comprises two semi-circular members each having a hinged end and a latched end, a hinge means for openably connecting together the hinged ends of said two semicircular members, said diameter controlling device being attached to said latched end of each of said two semicircular members.

7. A combinational weighing machine comprising:
  a dispersing means for dispersing articles received thereon;
  a plurality of weighing devices each having a feeder for receiving a portion of said articles from said dispersing means, a vibrator for causing said feeder to vibrate to thereby cause articles to be transported on said feeder, an attaching mechanism for attaching said feeder to said vibrator, and a weighing means for outputting a weight signal indicative of the quantity of a batch of said articles received from said feeder;
  a control unit for calculating combinations of said weight signals and selecting one of said combinations according to a predefined criterion;
  said attaching mechanism comprising:
    a lower engaging member attached to said vibrator;
    an upper engaging member attached to said feeder and being placed on and engageable with said lower engaging member, said lower and upper engaging members each having a peripheral part;
    an annular clamp which has an inner surface and is wrapped around and engageable with said peripheral parts of said lower and upper engaging members together, at least one selected from the peripheral part of said lower engaging part and the peripheral part of said upper engaging member being tapered with respect to said inner surface of said annular clamp; and
    a diameter controlling device attached to said clamp for reducing a diameter of said clamp and thereby causing said lower and upper engaging members to be pressed against each other.

8. The mechanism of claim 7 wherein said clamp comprises a clamping member having a generally U-shaped cross-section with a groove capable of accepting therein and engaging with said peripheral parts of said lower and upper engaging members.

9. The mechanism of claim 8 wherein said clamping member engages with said peripheral parts substantially entirely.

10. The mechanism of claim 7 wherein said clamp comprises a plurality of clamping members each having a generally U-shaped cross-section with a groove capable of accepting a portion of said peripheral parts of said lower and upper engaging members therein and engaging with said portion of said peripheral parts, said plurality of clamping members being evenly distributed on said peripheral parts.

11. The mechanism of claim 7 wherein said clamp comprises a lower rim which engages with the peripheral part of said lower engaging member and an upper rim which engages with the peripheral part of said upper engaging member; wherein at least one selected from the group consisting of the peripheral part of said lower engaging member, the peripheral part of said upper engaging member, said lower rim and said upper rim has a tapered surface; and wherein a force of said clamp communicated through said tapered surface, as the diameter of said clamp is reduced, causes said lower and upper engaging members to be pressed towards each other.

12. The mechanism of claim 7 wherein said clamp comprises two semi-circular members each having a hinged end and a latched end, a hinge means for openably connecting together the hinged ends of said two semicircular members, said diameter controlling device being attached to said latched end of each of said two semi-circular members.

* * * * *